United States Patent
Gao et al.

(10) Patent No.: US 10,623,916 B2
(45) Date of Patent: Apr. 14, 2020

(54) TERMINAL MANAGEMENT METHOD AND NETWORK DEVICE FOR CONTEXT CLUSTER PROCESSING

(71) Applicant: HUAWEI TECHNOLOGIES CO., LTD., Shenzhen, Guangdong (CN)

(72) Inventors: Xiaofeng Gao, Beijing (CN); Junling Zhu, Shenzhen (CN); Xinsheng Luo, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 268 days.

(21) Appl. No.: 15/388,370

(22) Filed: Dec. 22, 2016

(65) Prior Publication Data

US 2017/0105114 A1    Apr. 13, 2017

Related U.S. Application Data

(63) Continuation of application No. PCT/CN2014/081285, filed on Jun. 30, 2014.

(51) Int. Cl.
*H04W 4/00* (2018.01)
*H04W 4/20* (2018.01)
(Continued)

(52) U.S. Cl.
CPC .............. *H04W 4/20* (2013.01); *H04L 41/50* (2013.01); *H04W 8/20* (2013.01); *H04W 8/30* (2013.01); *H04W 24/04* (2013.01); *H04W 28/08* (2013.01)

(58) Field of Classification Search
CPC .......... H04W 8/18; H04W 8/20; H04W 4/20; H04W 28/08; H04L 41/50
See application file for complete search history.

(56) References Cited

U.S. PATENT DOCUMENTS

| 6,115,463 A | 9/2000 | Coulombe et al. |
| 2005/0083862 A1 | 4/2005 | Kongalath |

(Continued)

FOREIGN PATENT DOCUMENTS

| CN | 101047982 A | 10/2007 |
| CN | 101330544 A | 12/2008 |

(Continued)

OTHER PUBLICATIONS

International Search Report dated Mar. 27, 2015 in corresponding International Application No. PCT/CN2014/081285.
(Continued)

*Primary Examiner* — Barry W Taylor
(74) *Attorney, Agent, or Firm* — Slater Matsil, LLP

(57) ABSTRACT

The method includes: sending, by a control unit, a context migration indication message to a first service processing unit and a data dispatch unit, where the message includes: a first cluster identifier corresponding to a first context cluster that is to be migrated, a unit identifier of a second service processing unit to which the first context cluster is to be migrated, and a cluster migration indication; sending, by the first service processing unit, the first context cluster to the second service processing unit according to the cluster migration indication; and changing, by the data dispatch unit according to the cluster migration indication, a correspondence between the first context cluster and the first service processing unit and stored in the data dispatch unit, and changing the first service processing unit into the second service processing unit.

14 Claims, 8 Drawing Sheets

(51) Int. Cl.
*H04W 8/30* (2009.01)
*H04L 12/24* (2006.01)
*H04W 8/20* (2009.01)
H04W 24/04 (2009.01)
H04W 28/08 (2009.01)

(56) References Cited

U.S. PATENT DOCUMENTS

| | | | |
|---|---|---|---|
| 2010/0061301 A1 | 3/2010 | Antal et al. | |
| 2011/0122845 A1* | 5/2011 | Meirosu | H04W 36/0055 370/332 |
| 2013/0136032 A1* | 5/2013 | Meirosu | H04W 8/02 370/254 |
| 2013/0188555 A1* | 7/2013 | Olsson | H04W 8/30 370/328 |
| 2013/0189951 A1 | 7/2013 | Lopez et al. | |
| 2013/0212284 A1 | 8/2013 | Milinski et al. | |
| 2013/0336286 A1* | 12/2013 | Anschutz | H04W 36/08 370/331 |
| 2015/0366000 A1* | 12/2015 | Bedekar | H04W 84/042 370/328 |
| 2019/0244132 A1* | 8/2019 | Ide | G06F 17/18 |

FOREIGN PATENT DOCUMENTS

| | | |
|---|---|---|
| CN | 101364937 A | 2/2009 |
| CN | 102450052 A | 5/2012 |
| CN | 102917025 A | 2/2013 |
| CN | 103269364 A | 8/2013 |
| EP | 2442596 A1 | 4/2012 |
| JP | 7-160657 | 6/1995 |
| WO | WO 2005/064954 A1 | 7/2005 |

OTHER PUBLICATIONS

International Search Report dated Mar. 27, 2015 in corresponding International Patent Application No. PCT/CN2014/081285.
Extended European Search Report dated Jul. 27, 2017 in corresponding European Patent Application No. 14896717.7.
Japanese Office Action dated Apr. 10, 2018 in corresponding Japanese Patent Application No. 2017-519747.
Office Action, dated Jan. 2, 2019, in Chinese Application No. 201480008898.5 (5 pp.).

* cited by examiner

TERMINAL MANAGEMENT METHOD AND NETWORK DEVICE FOR CONTEXT CLUSTER PROCESSING

CROSS-REFERENCE TO RELATED APPLICATIONS

This application is a continuation of International Application No. PCT/CN2014/081285, filed on Jun. 30, 2014, the disclosure of which is hereby incorporated by reference in its entirety.

TECHNICAL FIELD

The present invention relates to communications technologies, and in particular, to a terminal management method and a network device.

BACKGROUND

Generally, terminal UE (such as a mobile phone or a wireless WAN card) is referred to as a user. During a process of communication between a user and a network device, a record, referred to as "user context", is created for the user in the network device (such as a mobility management entity (Mobility Management Entity, MME for short), a serving gateway (Serving Gateway, SGW for short), or a packet data network gateway (Packet data network Gateway, PGW for short)). The user context is used for storing device information of a terminal, such as a mobile phone number, a device number, an IP address, or a quality of service (Quality of Service, Qos for short) parameter. The user context is used for keeping in communication with the terminal during a communication process of the terminal and used for service processing of the terminal, so that one aspect of terminal management by the network device is management on the user context. The network device includes a data distribution unit (Data Distribution Unit, DDU for short) and a service processing unit (Service Processing Unit, SPU for short). The user context is stored in the SPU. The DDU stores a correspondence between the user context and the SPU, that is, a user context of a user is stored in which SPU. The DDU may forward, according to the correspondence, service data of the user to the SPU for processing.

In a cloud environment, the network device needs to be capable of performing scale out (scale out) or scale in (scale in) automatically according to a load condition, that is, have a flexible property for migrating and balancing work load based on performance requirements, for example, adding an SPU when load of the network device increases, so as to improve a service processing capability. Then, during the foregoing process of scale out or scale in, migration of the user context is involved. For example, when an SPU is removed for scale in, a user context in the SPU needs to be migrated to another SPU, that is, the user is migrated to another SPU for service processing. In the prior art, when a network device performs user context migration, the network device performs migration indication on user contexts in an SPU one by one, and correspondences between user contexts and the SPU are also changed one by one in a DDU. This process makes processing efficiency of user context migration very low, which affects normal performance of a user service. Moreover, when the DDU processes a service of another type, the DDU also needs to operate user contexts one by one, for example, when SPUs corresponding to a group of users are changed, SPUs corresponding to user contexts need to be changed one by one, that is, the current manner makes a speed at which the network device processes the user context low, which also then causes service processing efficiency for a user to be low.

SUMMARY

Embodiments of the present invention provide a terminal management method and a network device, so as to resolve a problem of low processing efficiency caused by a manner in which user contexts corresponding to a terminal are processed one by one.

According to a first aspect, a terminal management method is provided, the method is executed by at least one service processing unit, a data dispatch unit and a control unit; the at least one service processing unit includes a first service processing unit and a second service processing unit; each service processing unit includes at least one context cluster, and each context cluster includes at least one user context; and the method includes:

sending, by the control unit, a context migration indication message to the first service processing unit and the data dispatch unit separately, where the context migration indication message includes: a first cluster identifier corresponding to a first context cluster that is to be migrated, a unit identifier of the second service processing unit to which the first context cluster is to be migrated, and a cluster migration indication;

sending, by the first service processing unit, the first context cluster corresponding to the first cluster identifier to the second service processing unit according to the cluster migration indication; and changing, by the data dispatch unit according to the cluster migration indication, a correspondence between the first context cluster and the first service processing unit and stored in the data dispatch unit, and changing the first service processing unit in the correspondence into the second service processing unit.

With reference to the first aspect, in a first possible implementation manner, after the sending, by the control unit, a context migration indication message to the first service processing unit, the method further includes:

storing, by the control unit, a correspondence between the first service processing unit and the first cluster identifier, so as to indicate, according to the correspondence, that the first context cluster corresponding to the first cluster identifier is migrated again back to the first service processing unit.

With reference to the first aspect, in a second possible implementation manner, the method further includes:

receiving, by the data dispatch unit, a data processing message, where the data processing message includes a user identifier and to-be-processed service data; and obtaining, according to the user identifier, a third context cluster corresponding to the user identifier; and acquiring, by the data dispatch unit, a fourth service processing unit, in the at least one service processing unit, corresponding to the third context cluster, and sending the service data to the fourth service processing unit.

With reference to the first aspect, in a third possible implementation manner, the method further includes:

receiving, by the data dispatch unit, a user activation message, where the user activation message includes context data and a user identifier, and establishing a correspondence between the user identifier and a fourth context cluster; acquiring, by the data dispatch unit, a fifth service processing unit corresponding to the fourth context cluster, and sending the context data, and a fourth cluster identifier of the fourth context cluster to the fifth service processing unit; and generating, by the fifth service processing unit, a user context according to the context data, and storing the user context in the fourth context cluster according to the fourth cluster identifier.

According to a second aspect, a terminal management method is provided, the method is executed by at least one service processing unit, a data dispatch unit and a control unit; the at least one service processing unit includes a first service processing unit and a second service processing unit; each service processing unit includes at least one context cluster, and each context cluster includes at least one user context; and the method includes:

sending, by the control unit, a context cluster allocation message to a newly added third service processing unit, where the context cluster allocation message includes: a second cluster identifier corresponding to a newly allocated second context cluster, and a cluster allocation indication; and establishing, by the third service processing unit, the second context cluster in the third service processing unit according to the cluster allocation indication;

sending, by the control unit, a context cluster adding message to the data dispatch unit, where the context cluster adding message includes: the second cluster identifier corresponding to the newly allocated second context cluster, a cluster adding indication, and a unit identifier of the third service processing unit; and recording, by the data dispatch unit, a correspondence between the second cluster identifier and the third service processing unit according to the cluster adding indication, so as to forward service data corresponding to the second context cluster to the third service processing unit according to the correspondence.

According to a third aspect, a terminal management method is provided, the method is executed by at least one service processing unit, a data dispatch unit and a control unit; the at least one service processing unit includes a first service processing unit and a second service processing unit; each service processing unit includes at least one context cluster, and each context cluster includes at least one user context; and the method includes:

receiving, by the data dispatch unit, a data processing message, where the data processing message includes a user identifier and to-be-processed service data; and obtaining, according to the user identifier, a third context cluster corresponding to the user identifier; and acquiring, by the data dispatch unit, a fourth service processing unit, in the at least one service processing unit, corresponding to the third context cluster, and sending the service data to the fourth service processing unit.

According to a fourth aspect, a terminal management method is provided, the method is executed by at least one service processing unit, a data dispatch unit and a control unit; the at least one service processing unit includes a first service processing unit and a second service processing unit; each service processing unit includes at least one context cluster, and each context cluster includes at least one user context; and the method includes:

receiving, by the data dispatch unit, a user activation message, where the user activation message includes context data and a user identifier, and establishing a correspondence between the user identifier and a fourth context cluster; acquiring, by the data dispatch unit, a fifth service processing unit corresponding to the fourth context cluster, and sending the context data, and a fourth cluster identifier of the fourth context cluster to the fifth service processing unit; and generating, by the fifth service processing unit, a user context according to the context data, and storing the user context in the fourth context cluster according to the fourth cluster identifier.

According to a fifth aspect, a network device is provided, including: at least one service processing unit, a data dispatch unit and a control unit, where the at least one service processing unit includes a first service processing unit and a second service processing unit; each service processing unit includes at least one context cluster, and each context cluster includes at least one user context;

the control unit is configured to send a context migration indication message to the first service processing unit and the data dispatch unit separately, where the context migration indication message includes: a first cluster identifier corresponding to a first context cluster that is to be migrated, a unit identifier of the second service processing unit to which the first context cluster is to be migrated, and a cluster migration indication;

the first service processing unit is configured to send the first context cluster corresponding to the first cluster identifier to the second service processing unit according to the cluster migration indication; and the data dispatch unit is configured to change, according to the cluster migration indication, a correspondence between the first context cluster and the first service processing unit and stored in the data dispatch unit, and change the first service processing unit in the correspondence into the second service processing unit.

With reference to the fifth aspect, in a first possible implementation manner, the control unit is further configured to: after sending the context migration indication message to the first service processing unit, store a correspondence between the first service processing unit and the first cluster identifier, so as to indicate again, according to the correspondence, that the first context cluster corresponding to the first cluster identifier is migrated back to the first service processing unit.

With reference to the fifth aspect, in a second possible implementation manner, the data dispatch unit is further configured to: receive a data processing message, where the data processing message includes a user identifier and to-be-processed service data; obtain, according to the user identifier, a third context cluster corresponding to the user identifier; and acquire a fourth service processing unit, in the at least one service processing unit, corresponding to the third context cluster, and send the service data to the fourth service processing unit.

With reference to the fifth aspect, in a third possible implementation manner, the data dispatch unit is further configured to: receive a user activation message, where the user activation message includes context data and a user identifier, and establish a correspondence between the user identifier and a fourth context cluster; and acquire a fifth service processing unit corresponding to the fourth context cluster, and send the context data, and a fourth cluster identifier of the fourth context cluster to the fifth service processing unit; and the fifth service processing unit is configured to generate a user context according to the context data, and store the user context in the fourth context cluster according to the fourth cluster identifier.

According to a sixth aspect, a network device is provided, including: at least one service processing unit, a data dispatch unit and a control unit, where the at least one service processing unit includes a first service processing unit and a second service processing unit; each service processing unit includes at least one context cluster, and each context cluster includes at least one user context;

the control unit is configured to: send a context cluster allocation message to a newly added third service processing unit, where the context cluster allocation message includes: a second cluster identifier corresponding to a newly allocated second context cluster, and a cluster allocation indication; and send a context cluster adding message to the data dispatch unit, where the context cluster adding message includes: the second cluster identifier corresponding to the newly allocated second context cluster, a cluster adding indication, and a unit identifier of the third service processing unit;

the third service processing unit is configured to establish the second context cluster in the third service processing unit according to the cluster allocation indication; and the data dispatch unit is further configured to record a correspondence between the second cluster identifier and the third service processing unit according to the cluster adding indication, so as to forward service data corresponding to the second context cluster to the third service processing unit according to the correspondence.

According to a seventh aspect, a network device is provided, including: at least one service processing unit, a data dispatch unit and a control unit, where the at least one service processing unit includes a first service processing unit and a second service processing unit; each service processing unit includes at least one context cluster, and each context cluster includes at least one user context;

the data dispatch unit receives a data processing message, where the data processing message includes a user identifier and to-be-processed service data; and obtains, according to the user identifier, a third context cluster corresponding to the user identifier; and the data dispatch unit acquires a fourth service processing unit, in the at least one service processing unit, corresponding to the third context cluster, and sends the service data to the fourth service processing unit.

According to an eighth aspect, a network device is provided, including: at least one service processing unit, a data dispatch unit and a control unit, where the at least one service processing unit includes a first service processing unit and a second service processing unit; each service processing unit includes at least one context cluster, and each context cluster includes at least one user context;

the data dispatch unit receives a user activation message, where the user activation message includes context data and a user identifier; and establishes a correspondence between the user identifier and a fourth context cluster;

the data dispatch unit acquires a fifth service processing unit corresponding to the fourth context cluster, and sends the context data, and a fourth cluster identifier of the fourth context cluster to the fifth service processing unit; and the fifth service processing unit generates a user context according to the context data, and stores the user context in the fourth context cluster according to the fourth cluster identifier.

Technical effects of the terminal management method and the network device provided in the present invention are: When a control unit indicates context migration, a context cluster is used as a unit for indicating migration, a data dispatch unit also uses the context cluster as a unit to record a service processing unit at which a context is located, and each context cluster includes at least one user context, resulting in a speed much faster than a speed of migration and recording of a single user context, thereby improving a migration speed of a user context corresponding to a terminal; and moreover, when a user context is stored by using the context cluster as a unit, a processing speed of another user context is also improved.

DESCRIPTION OF EMBODIMENTS

Figure 1:
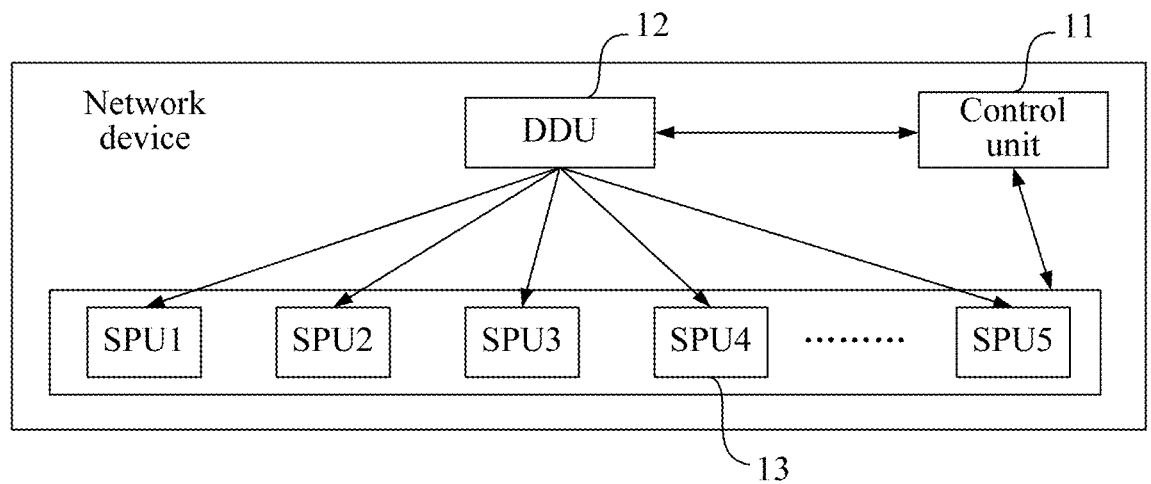
FIG. 1 is a schematic structural diagram of a network device to which a terminal management method is applied according to an embodiment of the present invention.

An embodiment of the present invention provides a terminal management method, as so to improve a migration speed of a user context when a network device performs scale out or scale in in a cloud environment. The network device is, for example, an MME or an SGW. For a logical structure of the network device, reference may be made to illustration in FIG. 1. FIG. 1 is a schematic structural diagram of a network device to which a terminal management method is applied according to an embodiment of the present invention. It should be noted that the network device shown in FIG. 1 may, in a cloud environment, also be a virtual device, that is, units on the device may not be located at a same physical device.

The network device may include: a control unit 11, a data dispatch unit (DDU) 12, and at least one service processing unit (SPU) 13. The DDU 12 is mainly responsible for implementing a signaling and data distribution function, and is configured to: when the DDU 12 receives signaling or data packets sent by a user, forward the signaling or data packets to the SPU 13 for processing; the SPU 13 is mainly responsible for implementing service processing of the user, and is configured to perform processing, for example, perform functions such as session management and accounting management of the user according to the signaling or data packets forwarded by the DDU 12. The control unit (Control Unit, CU for short) 11 may be configured to manage and control the DDU 12 and the SPU 13, to implement overall function management of the network device.

The SPU 13 stores a user context and is configured to process a service of a user corresponding to the user context. Assuming that there is a user Y1, after the DDU 12 receives a data packet of the user Y1, the DDU 12 records which SPU is responsible for processing of the user Y1, and after the DDU 12 finds an SPU corresponding to the Y1, the DDU 12 forwards the data packet of the Y1 to the corresponding SPU. Assuming that an SPU4 is responsible for processing of the Y1, after the DDU 12 forwards the data packet to the SPU4, the SPU4 stores a user context of the user Y1, and the SPU4, according to the user context, keeps in communication with the Y1 and performs service processing.

Figure 2:
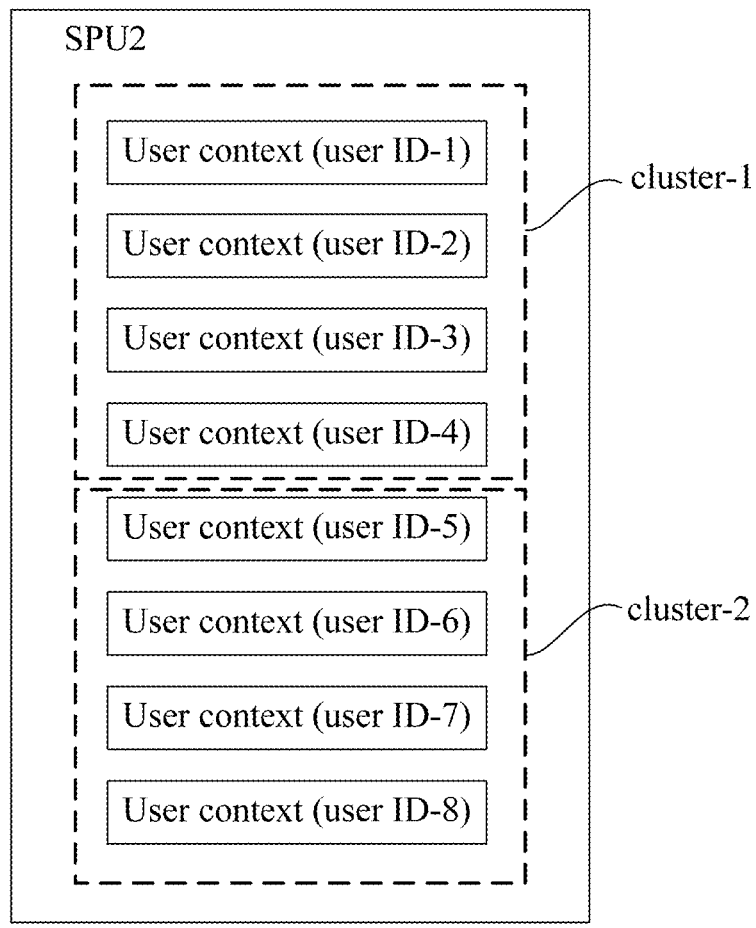
FIG. 2 is a schematic diagram of cluster grouping in a terminal management method according to an embodiment of the present invention.

In this embodiment, a new concept is designed for the foregoing user context, that is, a context cluster, and a group of user contexts is grouped into a logical entity, that is, a cluster. For example, referring to FIG. 2, FIG. 2 is a schematic diagram of cluster grouping in a terminal management method according to an embodiment of the present invention. Assuming that an SPU2 stores 8 user contexts, which correspond to 8 users separately, then 4 user contexts may be grouped into one cluster. For example, as shown in FIG. 2, 4 user contexts corresponding to a user ID-1 to a user ID-4 form one context cluster, referred to as a cluster-1; 4 user contexts corresponding to a user ID-5 to a user ID-8 form the other context cluster, referred to as a cluster-2. User contexts on other SPUs may also be grouped in a same way, that is, every 4 user contexts are grouped into one group to form one cluster. That is, in the network device, each SPU is processed in a manner of grouping 4 user contexts into one cluster. Moreover, a cluster id, equivalent to an identifier of a cluster, may be allocated to each cluster. For example, cluster-1 and cluster-2 may also be used as identifiers for distinguishing clusters.

Figure 3:
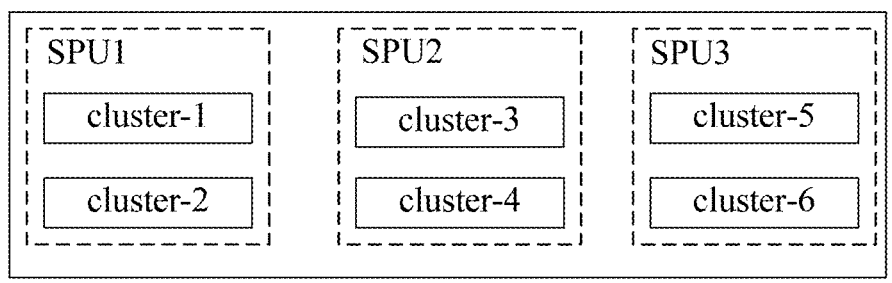
FIG. 3 is a schematic diagram of cluster distribution in a terminal management method according to an embodiment of the present invention.

In addition, clusters in SPUs also need to be distinguished from each other, that is, identifiers of clusters on different SPUs also need to be different, so that each cluster has a definite service location. For example, referring to FIG. 3, FIG. 3 is a schematic diagram of cluster distribution in a terminal management method according to an embodiment of the present invention. In FIG. 3, an SPU1 to an SPU3 are used as an example. It can be seen that identifiers of clusters in SPUs are different from each other. It should be noted that cluster is only a concept in this embodiment of the present invention, and certainly, may also be replaced with any other similar word.

In addition, it should be noted that a quantity of user contexts included in one cluster is not limited in this embodiment. There may be many grouping methods, for example, 4 user contexts may be grouped into one cluster, or, 10 or 20 user contexts may be grouped into one cluster. A principle on which cluster grouping is based is not limited either, which, for example, may be grouping of 4 user contexts performed according to a requirement of a service scenario, so as to be more advantageous for service processing, or may be using SPU space more properly, or may be other various reasons, which are not excessively limited in this embodiment, provided that one group of user contexts is grouped into one cluster. An extreme case is that one SPU has only one cluster, and all users that are processed on the SPU all belong to the cluster. Another extreme case is that each cluster in has only one user.

Figure 4:
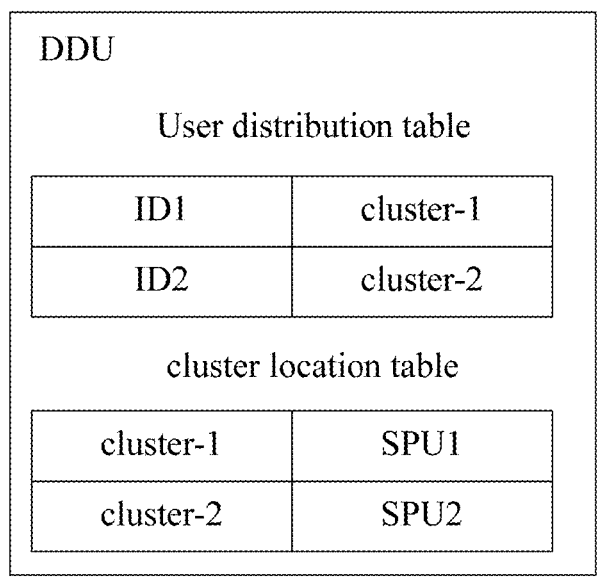
FIG. 4 is a schematic diagram of a DDU table in a terminal management method according to an embodiment of the present invention.

It can be seen from the foregoing descriptions that, on an SPU, a user context is organized and managed by using a cluster. Correspondingly, on a DDU, an improvement is also made in this embodiment, and addressing of a user context is also performed according to a cluster. Specifically, reference may be made to FIG. 4, and FIG. 4 is a schematic diagram of a DDU table in a terminal management method according to an embodiment of the present invention. Two types of tables are maintained on a DDU. One type is a user distribution table, used for recording a correspondence between a user identifier and a context cluster. For example, as shown in FIG. 4, a correspondence exists between a user identifier ID1 and a cluster-1, which indicates that a user context of a user corresponding to the ID1 is grouped in the cluster-1, and a correspondence exists between a user identifier ID2 and a cluster-2, which indicates that a user context of a user corresponding to the ID2 is grouped in the cluster-2. The user identifier refers to any attribute that can identify a user, such as an IMSI, a TEID, or a GRE key. Another type that is maintained on the DDU is a context cluster location table, that is, a cluster location table, used for recording a correspondence between a context cluster and a service processing unit. For example, as shown in FIG. 4, a correspondence exists between a cluster-1 and an SPU1, which indicates that the cluster-1 is located in the SPU1, and a correspondence exists between a cluster-2 and an SPU2, which indicates that the cluster-2 is located in the SPU2. It should be noted that a location of a cluster in FIG. 4 is just an example, which may be different from an example in FIG. 2 or FIG. 3.

According to the foregoing descriptions, the DDU stores the user distribution table and the cluster location table, and performs user context addressing by using the two tables and forwards data correspondingly. A user context is also organized on the SPU according to a cluster. Based on this structure, the terminal management method of this embodiment of the present invention is described in the following to describe how migration of a corresponding user context is completed when a user is migrated.

Embodiment 1

Figure 5:
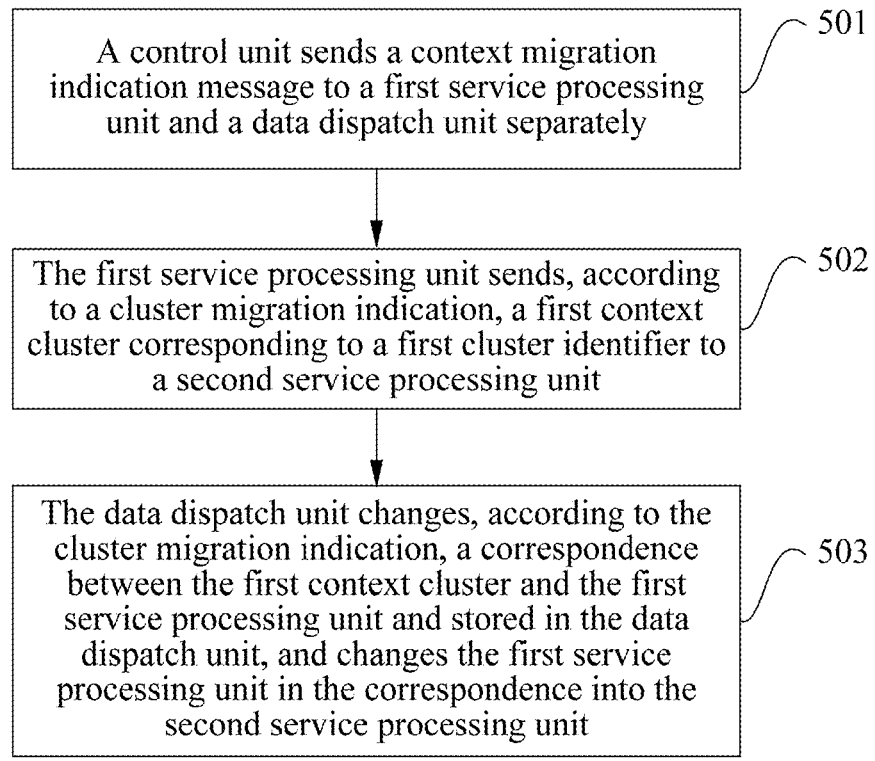
FIG. 5 is a schematic flowchart of a terminal management method according to an embodiment of the present invention.

In a cloud environment, user migration in a network device refers to that when the network device performs scale out (scale out) or scale in (scale in) according to a current load condition, for example, adding an SPU or removing an SPU, so as to correspondingly improve or reduce a service processing capability of the network device, during this process, a user context stored in the SPU also needs to be migrated accordingly. For example, when an SPU is removed, a user context in the original SPU needs to be migrated to another SPU. FIG. 5 is a schematic flowchart of a terminal management method according to an embodiment of the present invention. As shown in FIG. 5, the method may include:

501: A control unit sends a context migration indication message to a first service processing unit and a data dispatch unit separately.

The first service processing unit in this embodiment is one of at least one SPU in a network device, for example, is an SPU2. Moreover, in this embodiment, the SPU2 is an SPU that needs to be changed. For example, the SPU2 needs to be removed for scale in, and a user context in the SPU2 needs to be migrated to another SPU; or, an SPU may be newly added, and a user context in the SPU2 needs to be migrated to the newly added SPU. That is, the SPU2 is a source SPU of user context migration.

The context migration indication message may include: a first cluster identifier corresponding to a first context cluster that is to be migrated, a unit identifier of a second service processing unit to which the first context cluster is to be migrated, and a cluster migration indication. Specifically, the first cluster identifier corresponding to the first context cluster that is to be migrated is, for example, cluster-1, that is, all user contexts in the cluster cluster-1 in the SPU2 are to be migrated. The second service processing unit to which the first context cluster is to be migrated is, for example, an SPU3, that is, the cluster-1 in the SPU2 is to be migrated to the SPU3. Then, the second service processing unit SPU3 is a target SPU of the user context migration, and the unit identifier corresponding to the target SPU is, for example, SPU3. The cluster migration indication may be used for notifying an SPU or a DDU that a cluster at which a user context is located is migrated.

For the DDU, after receiving the context migration indication message, the DDU may learn, according to the cluster migration indication, that a location of a cluster is changed and a cluster location table needs to be updated; and may also learn that it is the cluster-1 that is migrated, and the target SPU to which the cluster-1 is migrated is the SPU3. In this way, the DDU may update the cluster location table accordingly, and update an SPU corresponding to the cluster-1 into the SPU3. Certainly, these are described in 503, and it is only intended here to describe a function of the context migration indication message for the DDU.

For the SPU2, after receiving the context migration indication message, the SPU2 may learn, according to the cluster migration indication, that the cluster-1 is to be migrated, and the target SPU to which the cluster-1 is migrated is the SPU3. In this way, the SPU2 may send all user contexts of the cluster-1 to the SPU3 accordingly. Certainly, these are described in 502, and it is only intended here to describe a function of the context migration indication message for the SPU2.

Optionally, the control unit may also send the context migration indication message to the SPU3, that is, the target SPU, so that the SPU3 also learns the migration process. Optionally, there may also be two or more clusters, on the SPU2, to be migrated, and a quantity of target SPUs is also greater than one. For example, the cluster-1 and a cluster-2 in the SPU2 both are to be migrated, where the cluster-1 is migrated to the SPU3, and the cluster-2 is migrated to an SPU4. Then, when the control unit sends the context migration indication message to the DDU and the SPU2, the control unit needs to point out a correspondence between a cluster and a target SPU, for example, pointing out that the cluster-1 is correspondingly migrated to the SPU3, and the cluster-2 is correspondingly migrated to the SPU4, so that the DDU and the SPU2 performs cluster location updating or cluster sending according to the correspondence. For another example, the cluster-1 and the cluster-2 in the SPU2 are migrated to the SPU3, and a cluster-3 is migrated to the SPU4, and so on. Many manners may be used, which are not described again.

502: The first service processing unit sends, according to a cluster migration indication, a first context cluster corresponding to a first cluster identifier to a second service processing unit.

For example, according to the cluster migration indication, the SPU2 migrates a cluster corresponding to the cluster-1, where migration of all user contexts in the cluster-1 is included; and sends the cluster-1 to the SPU3.

503: The data dispatch unit changes, according to the cluster migration indication, a correspondence between the first context cluster and the first service processing unit and stored in the data dispatch unit, and changes the first service processing unit in the correspondence into the second service processing unit.

For example, the DDU changes, according to the cluster migration indication, a correspondence, in the cluster location table, between a cluster and an SPU, and changes the SPU2 into the SPU3, that is, changes a source SPU of a migrated cluster into a target SPU. It should be noted that, during this process, only an SPU at which a cluster is located is changed, while a cluster at which a user context is located is not changed, so that a user distribution table does not need to be updated in the DDU, and only the cluster location table needs to be updated.

After the foregoing migration operation, the DDU forwards data according to a new cluster location table. For example, the DDU receives a data packet sent by a user, a user identifier is ID1, and the DDU searches the user distribution table and learns that a user ID1 corresponds to the cluster-1, that is, a user context of the user is in the cluster-1; then the DDU searches the cluster location table and learns that the cluster-1 corresponds to the SPU3, that is, the current cluster-1 is in the SPU3, so that the DDU accordingly sends the data packet to the SPU3 for processing; however, before the cluster location table is updated, the cluster-1 corresponds to the SPU2, and the DDU sends the data packet to the SPU2.

In the terminal management method provided in this embodiment, when a control unit indicates context migration, a context cluster, that is, a cluster, is used as a unit for indicating migration, a data dispatch unit also uses the context cluster as a unit to record a service processing unit at which a context is located, and each context cluster includes at least one user context, resulting in a speed much faster than a speed of migration and recording of a single user context, thereby improving a migration speed of a user context corresponding to a terminal.

In order to describe effects of the method of this embodiment more clearly, an example is given as follows: Assuming that a cluster-1 in an SPU2 has 10 user contexts, if the solution of the prior art is used, a control unit needs to indicate migration of the user contexts one by one, for example, indicate that the SPU2 "migrates a user context of a user identifier being ID1", and then indicate "migrating a user context of a user identifier being ID2", and so on; moreover, locations of contexts also need to be changed one by one on the DDU, for example, "update an SPU corresponding to the user context of the user identifier being ID1 from the SPU2 into an SPU3", then "update an SPU corresponding to the user context of the user identifier being ID2 from the SPU2 into the SPU3", and then "update an SPU corresponding to a user context of a user identifier being ID3 from the SPU2 into the SPU3", and so on; however, if the solution of this embodiment of the present invention is used, migration may be indicated for all the user contexts included in the cluster-1 provided that a control unit indicates "migrating the cluster-1"; moreover, a DDU also only needs to update "updating an SPU corresponding to the cluster-1 from the SPU2 into the SPU3", and location updating is implemented for all the user contexts included in the cluster-1. It can be seen clearly from the foregoing comparison that, the solution of this embodiment can greatly improve user context migration efficiency, and ensure that during a process of scale out or scale in, a user does not lose connection and a user service has no loss; moreover, after context migration, on a DDU, only a cluster location table needs to be refreshed, while a user distribution table does not need to be refreshed, so that processing efficiency is also relatively high.

According to the foregoing descriptions, introduction of a cluster improves processing efficiency of user migration. More specifically, for a DDU, during the user migration, only a cluster location table on the DDU needs to be updated, while a user distribution table does not need to be updated, and a user context migration process can be completed simply and quickly; for an SPU, when a user context is migrated, the SPU only needs to perform migration management according to a context cluster, for example, migration of all user contexts included in a cluster may be implemented by indicating migration of the cluster, which, relative to that migration is indicated for user contexts one by one in the prior art, is simpler and quicker; for a control unit, it is easier to manage load balancing between SPUs by using a cluster, for example, provided that a grouping granularity of clusters is appropriate, and a quantity of user contexts included in each cluster is a proper quantity, several clusters on an SPU may be migrated to other SPUs evenly, so that load balancing between the SPUs is roughly kept; moreover, the control unit only needs to manage the cluster, and does not need to be concerned about user contexts included in the cluster, and in this way, management difficulty for the control unit is reduced and processing efficiency is improved.

Embodiment 2

Figure 6:
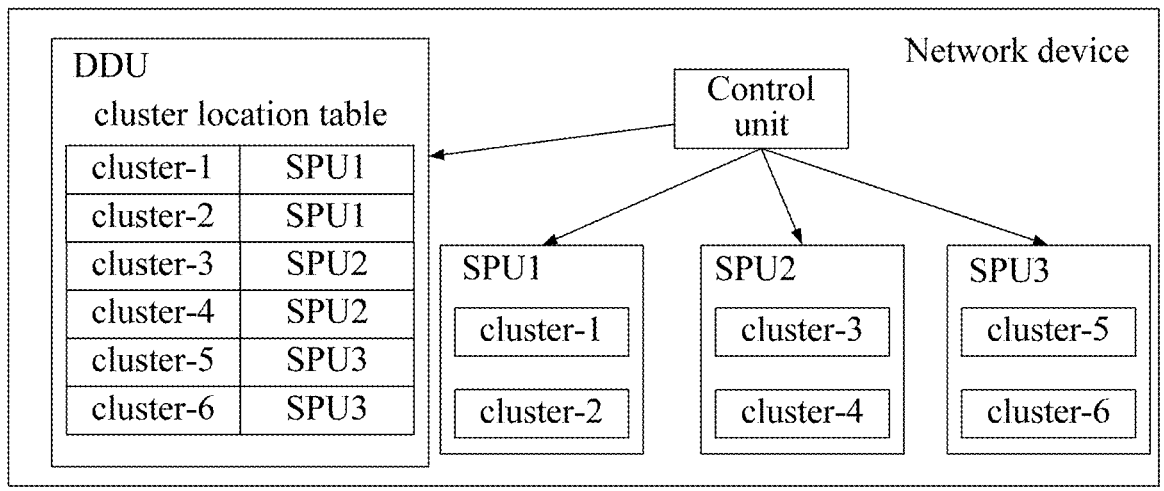
FIG. 6 shows a schematic state 1 of a network device to which another terminal management method is applied according to an embodiment of the present invention.

In this embodiment, a process of scale in processing of a network device is used as an example. FIG. 6 is a schematic state 1 of a network device to which another terminal management method is applied according to an embodiment of the present invention. Referring to FIG. 6, for simplicity, it is assumed that there are three SPUs in the network device, which are an SPU1, an SPU2 and an SPU3, each SPU has two clusters, a cluster-1 and a cluster-2 are allocated to the SPU1, a cluster-3 and a cluster-4 are allocated to the SPU2, and a cluster-5 and a cluster-6 are allocated to the SPU3. A cluster location table in a DDU records initial correspondences between the foregoing clusters and SPUs. Because a user distribution table does not need to be updated, for simplicity and clarity, the user distribution table is not shown in FIG. 6.

Figure 7:
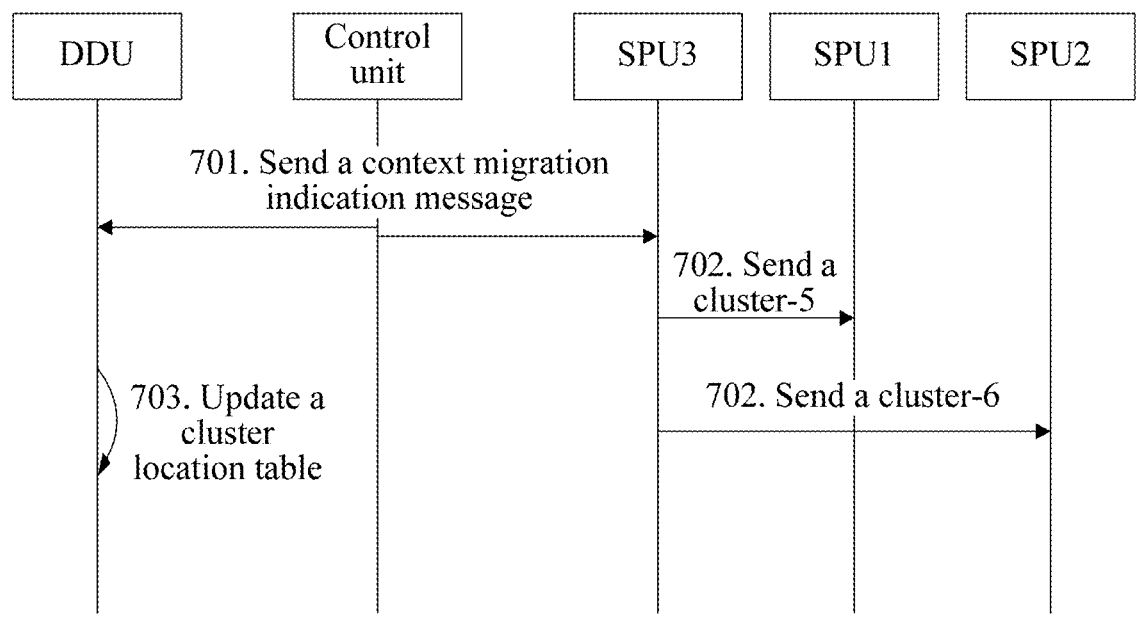
FIG. 7 is a schematic signaling diagram of another terminal management method according to an embodiment of the present invention.

It is assumed that the network device performs scaling in processing to remove the SPU3. Certainly, an operation of removing the SPU3 is performed by a control unit, and the control unit may determine, according to a load condition of the network device, whether to remove or add an SPU. Then, user contexts on the SPU3 need to be migrated according to FIG. 7. FIG. 7 is a schematic signaling diagram of another terminal management method according to an embodiment of the present invention. The method includes:

701: The control unit sends a context migration indication message to the SPU3 and the DDU separately.

The context migration indication message includes: at least one first cluster identifier corresponding to at least one first context cluster that is to be migrated, at least one unit identifier of at least one second service processing unit to which the at least one first context cluster is to be migrated, and a cluster migration indication. The at least one first cluster identifier corresponding to the at least one first context cluster is a cluster-5 and a cluster-6, and the at least one unit identifier of the at least one second service processing unit to which the at least one first context cluster is to be migrated includes an SPU1 and an SPU2. Moreover, the cluster-5 is migrated to the SPU1, the cluster-6 is migrated to the SPU2, and the cluster migration indication is, for example, "1" ("0" may be used to indicate no migration, and "1" may be used to indicate migration).

702: The SPU3 migrates the clusters to corresponding SPUs according to the cluster migration indication.

Specifically, the SPU3 sends all user contexts in the cluster-5 to the SPU1, and sends all user contexts in the cluster-6 to the SPU2.

703: The DDU updates the cluster location table according to the cluster migration indication.

Specifically, the DDU changes the SPU3 corresponding to the cluster-5 in the cluster location table into the SPU1, and changes the SPU3 corresponding to the cluster-6 into the SPU2.

It should be noted that an execution order of steps is not limited in this embodiment, for example, 702 and 703 may be performed at the same time, or 703 is performed before 702; certainly, preferably, 702 is performed first.

Figure 8:
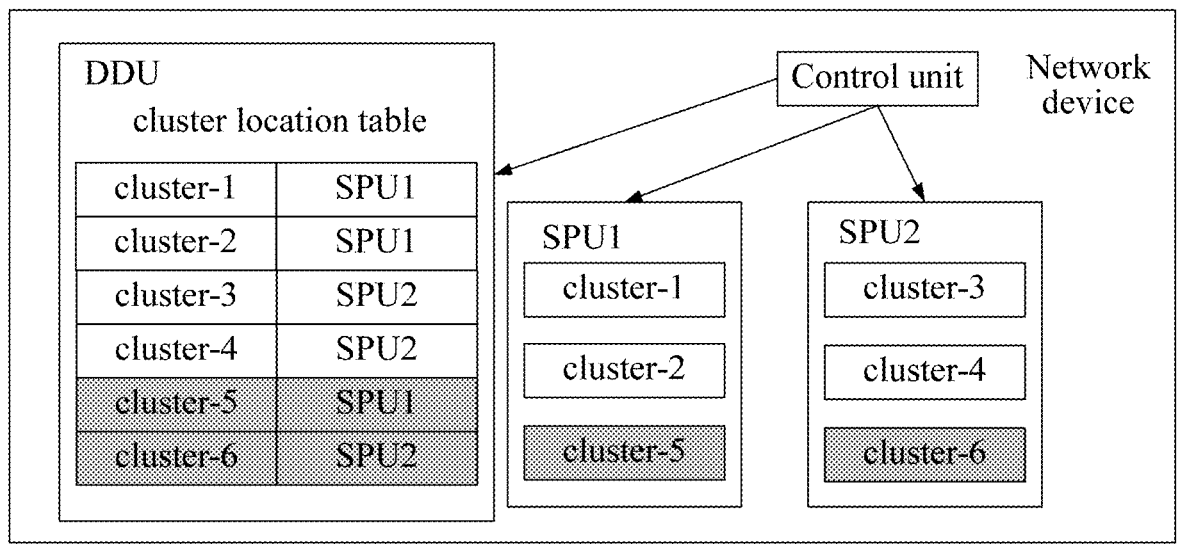
FIG. 8 is a schematic state 2 of a network device to which another terminal management method is applied according to an embodiment of the present invention.

After a scale in process of the foregoing steps, for distribution of clusters in the network device and a state of the DDU, reference may be made to FIG. 8. FIG. 8 is a schematic state 2 of a network device to which another terminal management method is applied according to an embodiment of the present invention. The cluster location table on the DDU has been updated, and the cluster-5 and the cluster-6 correspond to the SPU1 and the SPU2 respectively. Moreover, the SPU3 has been removed, the cluster-5 is added to the SPU1, and the cluster-6 is added to the SPU2.

Figure 9:
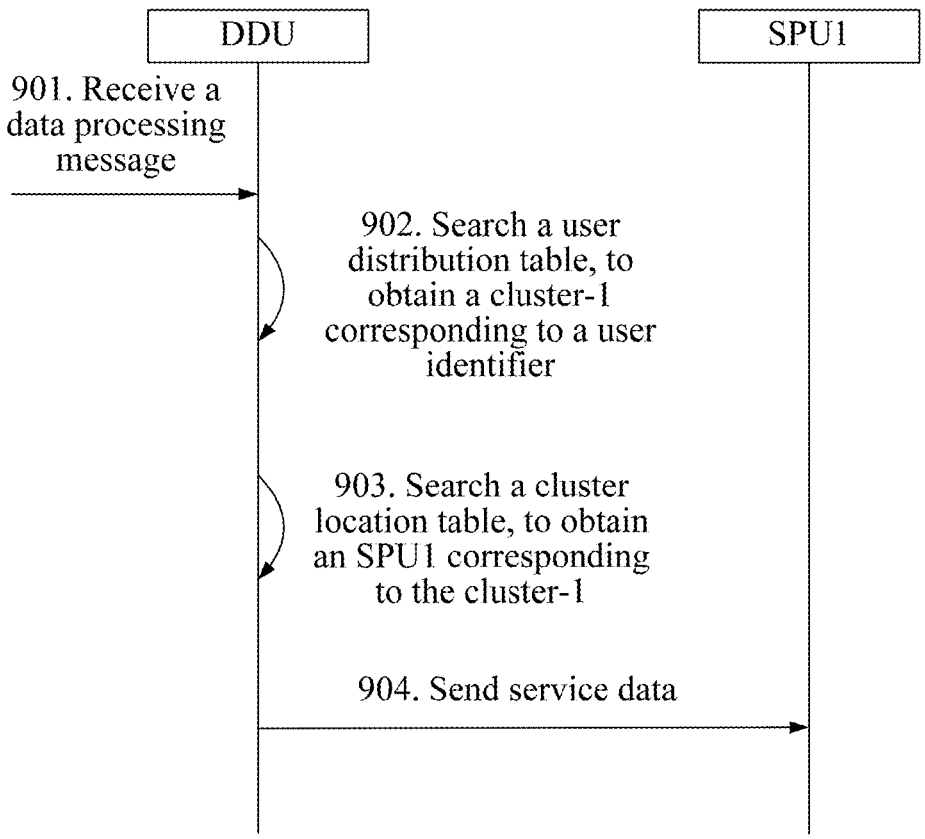
FIG. 9 is a signaling diagram of service processing of another terminal management method according to an embodiment of the present invention.

On the basis of a new structure of the network device shown in FIG. 8, this embodiment describes a data forwarding and processing process performed by the network device. FIG. 9 is a signaling diagram of service processing of another terminal management method according to an embodiment of the present invention. As shown in FIG. 9, the method includes:

901: The DDU receives a data processing message, where the data processing message includes a user identifier and to-be-processed service data.

For example, the data processing message may be sent by a terminal (that is, a user, such as a mobile phone) to the network device. The message includes: the user identifier, such as an ID1 or an ID2, and the ID may be an attribute, such as an IMSI or a TEID, that can identify a user; the message further includes the to-be-processed service data.

902: The DDU searches a user distribution table, to obtain a cluster-1 corresponding to the user identifier.

For example, the DDU may search a user distribution table of the DDU to obtain a cluster corresponding to the user identifier. Assuming that the user identifier is the ID1, in this embodiment, the cluster corresponding to the ID1, for example, the cluster-1, is referred to as a third context cluster. Certainly, the third context cluster is only a name used for distinguishing the third context cluster from a context cluster in other embodiments, and may be changed into another name in specific implementation.

903: The DDU searches the cluster location table, to acquire the SPU1 corresponding to the cluster-1.

For example, the DDU searches the cluster location table and learns that the cluster-1 is located on the SPU1. The SPU1 may be referred to as a fourth service processing unit, which, certainly, is also only a name for distinguishing the fourth service processing unit from a service processing unit in other embodiments, and does not constitute a limitation on the solution of this embodiment.

904: The DDU sends the service data to the SPU1.

It should be noted that the third context cluster in this embodiment of the present invention is used for representing only a name of a context cluster in a data forwarding and processing procedure. Specifically, another context cluster, such as a first context cluster, a second context cluster, or a fourth context cluster, in this embodiment of the present invention may be applied to a data forwarding and processing procedure. Specifically, the third context cluster may be the first context cluster, the second context cluster, the fourth context cluster, or any other context cluster.

Similarly, the fourth service processing unit is used for representing only a name of a service processing unit in a data forwarding and processing procedure. Specifically, another service processing unit, such as a first service processing unit, a second service processing unit, or a fifth service processing unit, in this embodiment of the present invention may be applied to a data forwarding and processing procedure. Specifically, the fourth service processing unit may be the first service processing unit, the second service processing unit, the fifth service processing unit, or any other service processing unit.

Embodiment 3

Figure 10:
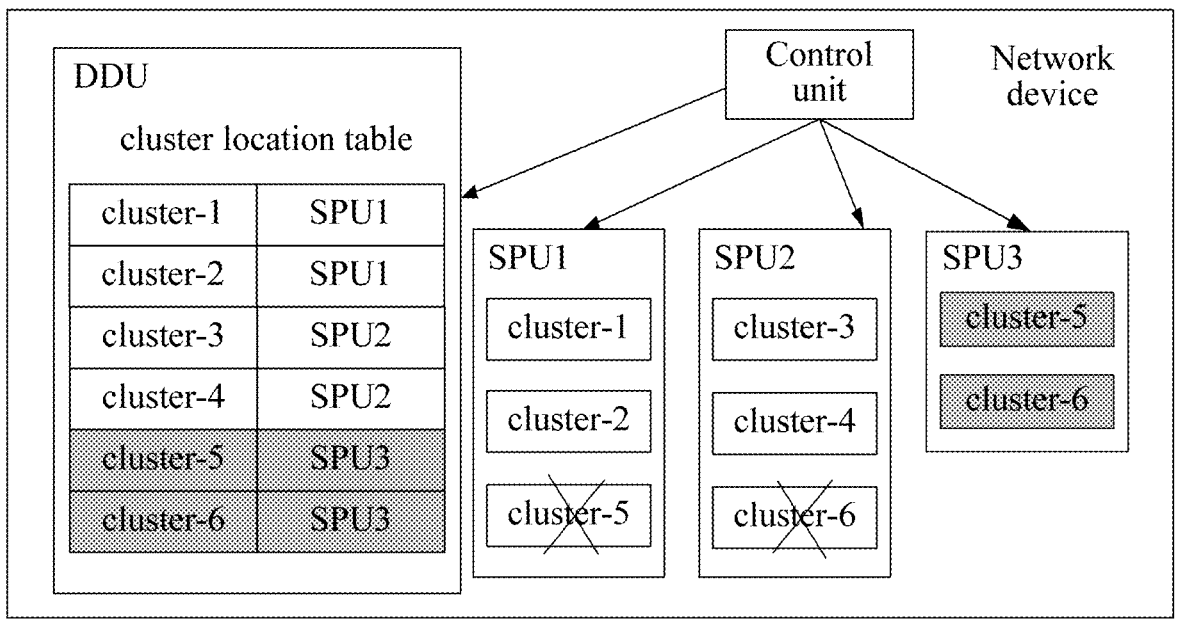
FIG. 10 is a schematic state of a network device to which still another terminal management method is applied according to an embodiment of the present invention.
Figure 11:
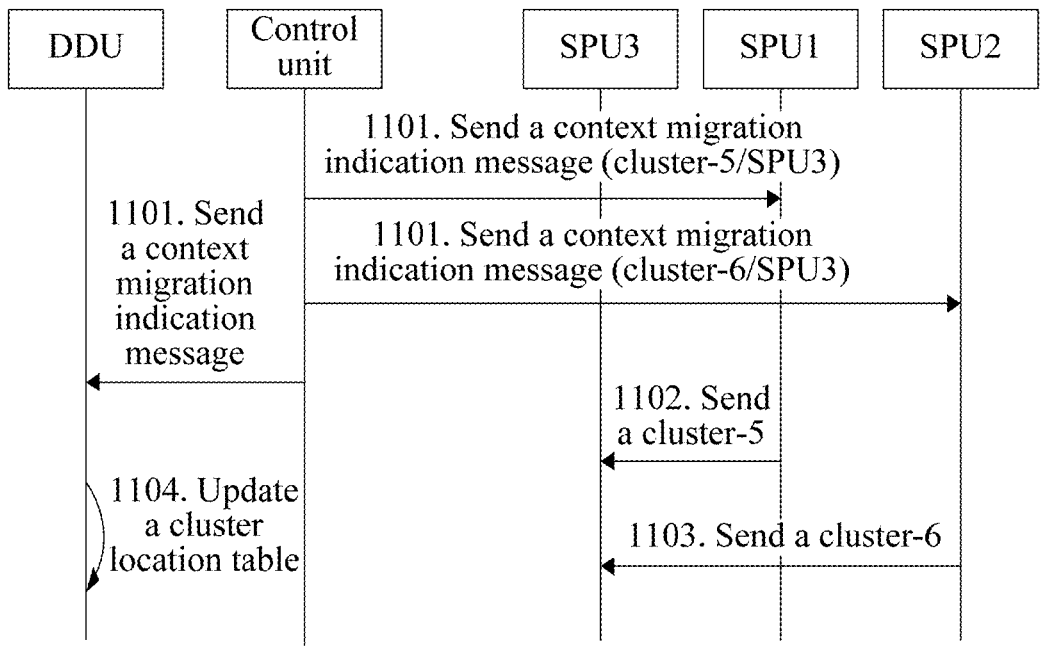
FIG. 11 is a schematic signaling diagram of still another terminal management method according to an embodiment of the present invention.

This embodiment mains describes that, after scale in, a network device performs scale out again, and an originally removed SPU is restored. FIG. 6 to FIG. 8 are still used as an example, and an SPU3 is removed. In this embodiment, the SPU3 is added to the network device again, and correspondingly, a cluster-5 and a cluster-6 that originally belong to the SPU3 also need to be returned to the SPU3. For a specific process, reference may be made to FIG. 10 and FIG. 11. FIG. 10 is a schematic state of a network device to which still another terminal management method is applied according to an embodiment of the present invention. FIG. 11 is a schematic signaling diagram of still another terminal management method according to an embodiment of the present invention. The method may include:

1101: A control unit sends a context migration indication message to an SPU1, an SPU2 and a DDU separately.

For example, the context migration indication message sent by the control unit to the SPU1 includes: a first cluster identifier corresponding to a first context cluster, that is, the cluster-5; a unit identifier of a second service processing unit to which the first context cluster is to be migrated, that is, the SPU3; and a cluster migration indication.

The context migration indication message sent by the control unit to the SPU2 includes: a first cluster identifier corresponding to a first context cluster, that is, the cluster-6; a unit identifier of a second service processing unit to which the first context cluster is to be migrated, that is, the SPU3; and a cluster migration indication.

The context migration indication message sent by the control unit to the DDU includes: the first cluster identifier corresponding to the first context cluster, that is, the cluster-6; the unit identifier of the second service processing unit to which the cluster-6 is to be migrated, that is, the SPU3; the cluster-5; the SPU3 to which the cluster-5 is to be migrated; and a cluster migration indication.

It should be noted in this embodiment that during a scale in process in the previous embodiment, after sending the context migration indication message, the control unit stores a correspondence between the first service processing unit and the first cluster identifier, that is, stores correspondences between the cluster-5 and the SPU3 and between the cluster-6 and the SPU3. Therefore, in this embodiment, it is indicated again according to the stored correspondences that the cluster-5 and the cluster-6 are migrated back to the SPU3.

1102: The SPU1 sends all user contexts of the cluster-5 to the SPU3.

1103: The SPU2 sends all user contexts of the cluster-6 to the SPU3.

1104: The DDU updates a cluster location table.

Specifically, SPUs corresponding to the cluster-5 and the cluster-6 are both updated into the SPU3.

After a scale out process of the foregoing steps, distribution of clusters in the network device and a state of the DDU are the same as those in FIG. 6.

The method of this embodiment ensures that a process of scale in and a process of scale out are completely reversible.

Embodiment 4

Figure 12:
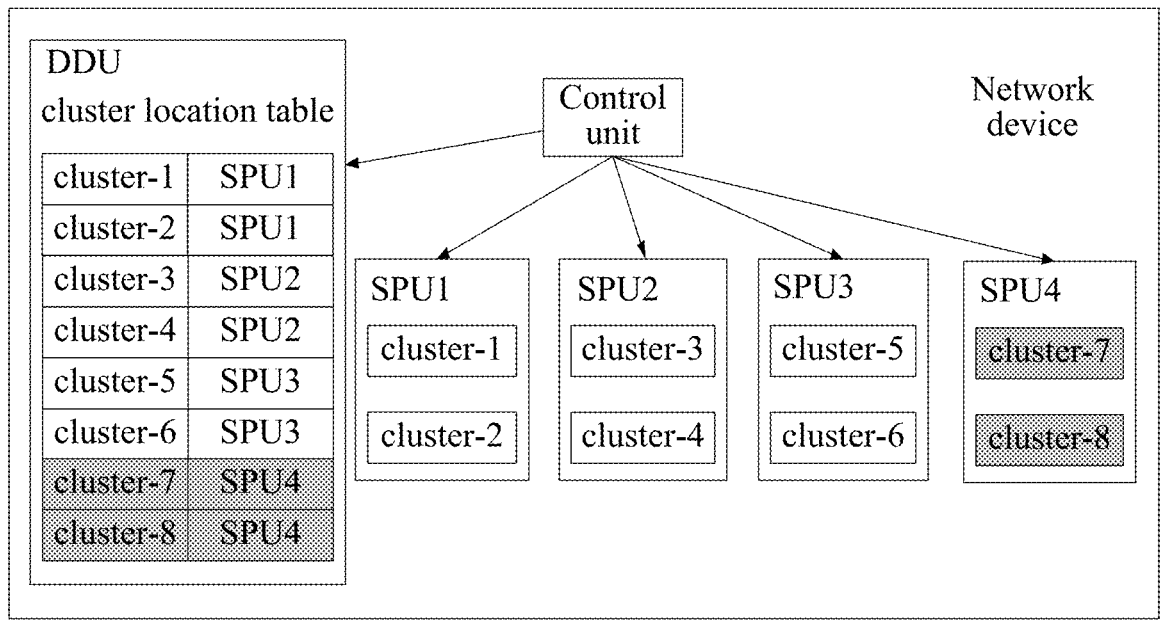
FIG. 12 is a schematic state of a network device to which still another terminal management method is applied according to an embodiment of the present invention.
Figure 13:
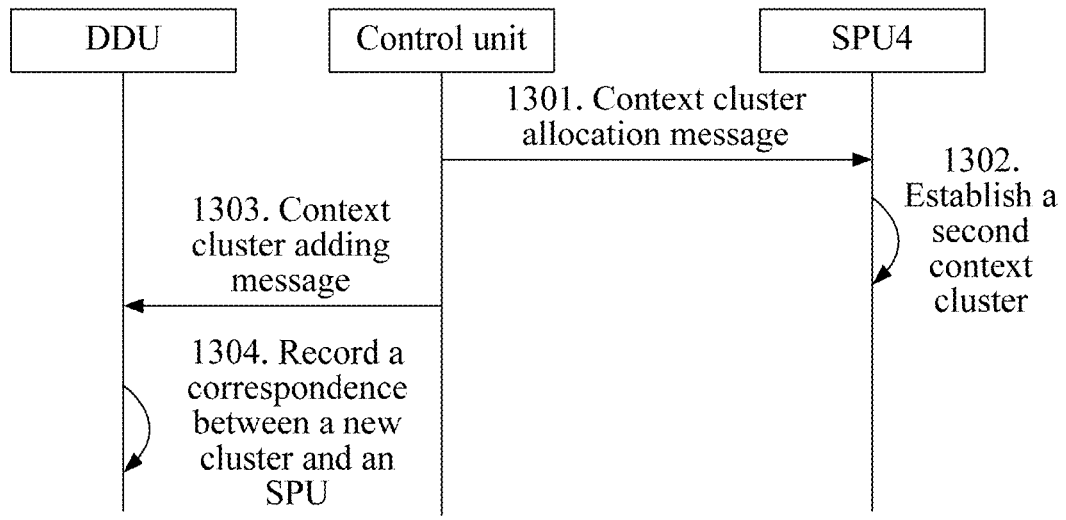
FIG. 13 is a schematic signaling diagram of still another terminal management method according to an embodiment of the present invention.

This embodiment mainly describes a processing process of adding a new SPU to a network device. In this embodiment, it is assumed that a control unit newly adds an SPU4, and needs to allocate two new clusters to the SPU4. Referring to FIG. 12 and FIG. 13, FIG. 12 is a schematic state of a network device to which still another terminal management method is applied according to an embodiment of the present invention, and FIG. 13 is a schematic signaling diagram of still another terminal management method according to an embodiment of the present invention. It should be noted that a processing method of newly adding an SPU in this embodiment may be a method that is performed independent from the foregoing context migration manner. The method of this embodiment may include:

1301: The control unit sends a context cluster allocation message to the newly added SPU4.

The SPU4 may be referred to as a third service processing unit. The context cluster allocation message includes: second cluster identifiers corresponding to newly allocated second context clusters, and a cluster allocation indication. Specifically, the second cluster identifiers corresponding to the newly allocated second context clusters include: a cluster-7 and a cluster-8.

1302: The SPU4 establishes the second context clusters according to the cluster allocation indication.

The second context clusters here are the cluster-7 and the cluster-8.

1303: The control unit sends a context cluster adding message to a DDU.

The context cluster adding message includes: the second cluster identifiers corresponding to the newly allocated second context clusters, a cluster adding indication, and a unit identifier of the third service processing unit. Specifically, the second cluster identifiers corresponding to the newly allocated second context clusters include the cluster-7 and the cluster-8, and the unit identifier of the third service processing unit is the SPU4.

In addition, which type of identifier is specifically used for the cluster adding indication here and the cluster allocation indication mentioned in 1301 is not limited, provided that the identifier can play a role of identification. For example, "11" is used for representing cluster distribution, that is, used for indicating that a new cluster is added to an SPU; "12" is used for representing cluster adding, that is, used for indicating that a location record corresponding to a new cluster is added to a DDU.

1304: The DDU records a correspondence between a new cluster and an SPU according to a cluster adding indication.

The DDU may record a correspondence between a cluster-7 and the SPU4, and record a correspondence between a cluster-8 and the SPU4.

After allocation of a new SPU and allocation of a new cluster, a data forwarding process of the DDU is similar to that in Embodiment 2, and is not described again.

Embodiment 5

Figure 14:
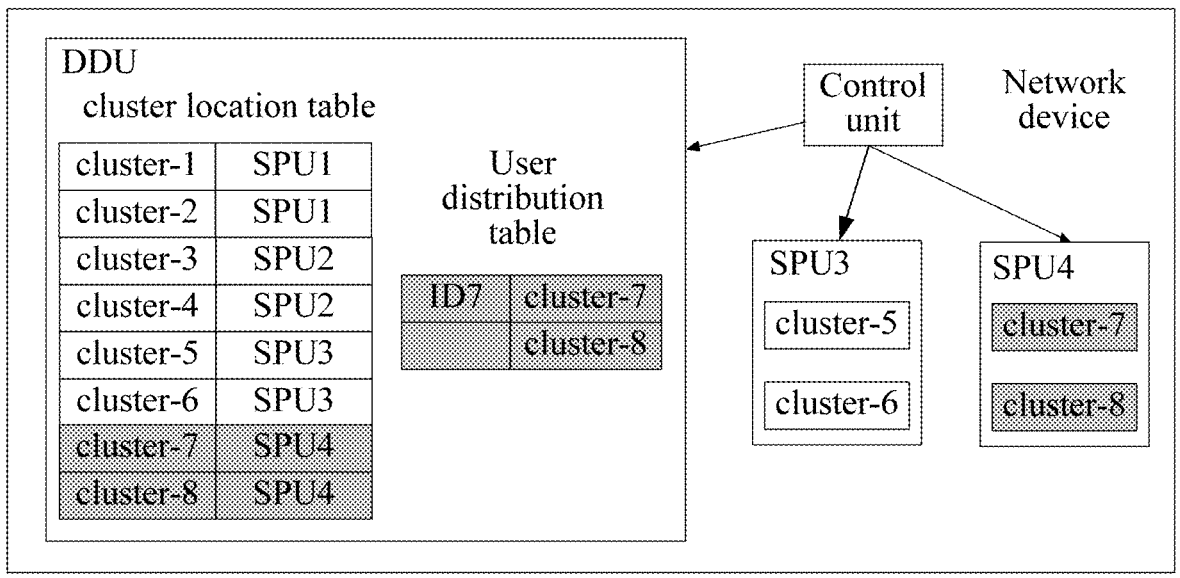
FIG. 14 is a schematic state of a network device to which still another terminal management method is applied according to an embodiment of the present invention.
Figure 15:
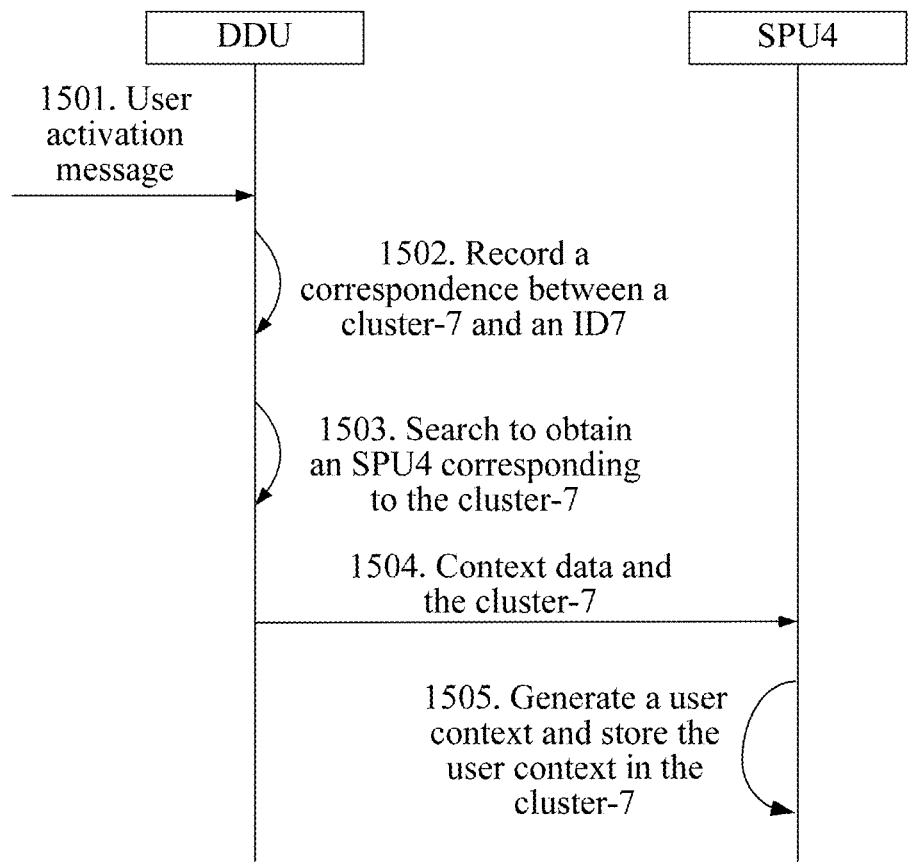
FIG. 15 is a schematic signaling diagram of still another terminal management method according to an embodiment of the present invention.

This embodiment mainly describes processing of a user activation process, for example, after an SPU and a cluster are newly established in Embodiment 4. FIG. 14 is a schematic state of a network device to which still another terminal management method is applied according to an embodiment of the present invention. FIG. 15 is a schematic signaling diagram of still another terminal management method according to an embodiment of the present invention. Referring to FIG. 14, a user distribution table in a DDU is only partially exemplified in this embodiment; moreover, an SPU1 to an SPU2 are omitted, and only an SPU3 and an SPU4 are shown. It should be noted that a processing method of user activation in this embodiment may be a method that is performed independent from the foregoing context migration manner. The method of this embodiment may include:

1501: A DDU receives a user activation message, where the user activation message includes context data and a user identifier.

The user activation message may be sent by UE. The context data refers to some data needed for establishing a user context, and may be some signaling. In this embodiment, it is assumed that the user identifier of a to-be-activated user is an ID7.

1502: The DDU establishes a correspondence between the user identifier and a cluster-7.

After receiving the user activation message, the DDU may select a cluster as a home of the user according to a load sharing principle. The load sharing principle is mainly for ensuring that each cluster has a roughly same quantity of users, so that load of each SPU is substantially the same. In this embodiment, it is assumed that the DDU allocates the user corresponding to the user identifier to the cluster-7.

For example, the DDU may record, in the user distribution table of the DDU, a correspondence between the ID7 and the cluster-7. The cluster-7 may be referred to as a fourth context cluster. No user has been allocated to a newly established cluster-8, so that a user identifier corresponding to the cluster-8 in the user distribution table does not exist.

1503: The DDU searches for the SPU4 corresponding to the cluster-7.

In this embodiment, the SPU4 may be referred to as a fifth service processing unit corresponding to the fourth context cluster. The DDU searches a cluster location table of the DDU and learns that the cluster-7 is on the SPU4.

1504: The DDU sends the context data and the cluster-7 to the SPU4.

In this step, the DDU may further send the user identifier ID7 to the SPU4, to notify the SPU4 that the context data of the user of the newly allocated ID7 is to be stored in the cluster-7. Because there are two newly established clusters on the SPU4, which are the cluster-7 and the cluster-8, it is required to tell the SPU4 the context data is specifically stored in which cluster.

1505: The SPU4 generates a user context according to the context data and stores the user context in the cluster-7.

As described in the foregoing, generally, before a service is performed and a data message is sent, a user needs to be activated first, that is, a user activation message is sent. During this process, the foregoing steps may be followed: A DDU allocates a to-be-activated user and allocates the user to a cluster, and the cluster is on an SPU, which is therefore equivalent to that the user is allocated to the SPU; and the SPU processes a service of the user.

It should be noted that the fourth context cluster in this embodiment of the present invention is used for representing only a name of a context cluster in a processing procedure of user activation. Specifically, another context cluster, such as a first context cluster, a second context cluster, or a third context cluster, in this embodiment of the present invention may be applied to a processing procedure of user activation. Specifically, the fourth context cluster may be the first context cluster, the second context cluster, the third context cluster, or any other context cluster.

Similarly, the fifth service processing unit is used for representing only a name of a service processing unit in a processing procedure of user activation. Specifically, another service processing unit, such as a first service processing unit, a second service processing unit, or a fourth service processing unit, in this embodiment of the present invention may be applied to a processing procedure of user activation. Specifically, the fifth service processing unit may be the first service processing unit, the second service processing unit, the fourth service processing unit, or any other service processing unit.

Embodiment 6

This embodiment provides a network device. The network device is, for example, an MME, an SGW, or a PGW. For a specific structure of the network device, reference may be made to FIG. 1. The network device may include: at least one service processing unit, a data dispatch unit and a control unit; the at least one service processing unit includes a first service processing unit and a second service processing unit; and each service processing unit includes at least one context cluster, and each context cluster includes at least one user context. The first service processing unit or the second service processing unit is one of SPUs in FIG. 1.

The control unit is configured to send a context migration indication message to the first service processing unit and the data dispatch unit separately, where the context migration indication message includes: a first cluster identifier corresponding to a first context cluster that is to be migrated, a unit identifier of the second service processing unit to which the first context cluster is to be migrated, and a cluster migration indication.

The first service processing unit is configured to send the first context cluster corresponding to the first cluster identifier to the second service processing unit according to the cluster migration indication.

The data dispatch unit is configured to change, according to the cluster migration indication, a correspondence between the first context cluster and the first service processing unit and stored in the data dispatch unit, and change the first service processing unit in the correspondence into the second service processing unit.

Further, the control unit is further configured to: after sending the context migration indication message to the first service processing unit, store a correspondence between the first service processing unit and the first cluster identifier, so as to indicate again, according to the correspondence, that the first context cluster corresponding to the first cluster identifier is migrated back to the first service processing unit.

The third service processing unit is configured to establish the second context cluster in the third service processing unit according to the cluster allocation indication.

The data dispatch unit is further configured to record a correspondence between the second cluster identifier and the third service processing unit according to the cluster adding indication, so as to forward service data corresponding to the second context cluster to the third service processing unit according to the correspondence.

Further, the data dispatch unit is further configured to: receive a data processing message, where the data processing message includes a user identifier and to-be-processed service data; obtain, according to the user identifier, a third context cluster corresponding to the user identifier; and acquire a fourth service processing unit, in the at least one service processing unit, corresponding to the third context cluster, and send the service data to the fourth service processing unit.

Further, the data dispatch unit is further configured to: receive a user activation message, where the user activation message includes context data and a user identifier, and establish a correspondence between the user identifier and a fourth context cluster; and acquire a fifth service processing unit corresponding to the fourth context cluster, and send the context data, and a fourth cluster identifier of the fourth context cluster to the fifth service processing unit; and the fifth service processing unit is configured to generate a user context according to the context data, and store the user context in the fourth context cluster according to the fourth cluster identifier.

An embodiment of the present invention further provides a network device. The device may likewise include: at least one service processing unit, a data dispatch unit and a control unit; the at least one service processing unit includes a first service processing unit and a second service processing unit; and each service processing unit includes at least one context cluster, and each context cluster includes at least one user context.

The control unit is configured to: send a context cluster allocation message to a newly added third service processing unit, where the context cluster allocation message includes: a second cluster identifier corresponding to a newly allocated second context cluster, and a cluster allocation indication; and send a context cluster adding message to the data dispatch unit, where the context cluster adding message includes: the second cluster identifier corresponding to the newly allocated second context cluster, a cluster adding indication, and a unit identifier of the third service processing unit.

The third service processing unit is configured to establish the second context cluster in the third service processing unit according to the cluster allocation indication.

The data dispatch unit is further configured to record a correspondence between the second cluster identifier and the third service processing unit according to the cluster adding indication, so as to forward service data corresponding to the second context cluster to the third service processing unit according to the correspondence.

An embodiment of the present invention further provides a network device. The device may likewise include: at least one service processing unit, a data dispatch unit and a control unit; the at least one service processing unit includes a first service processing unit and a second service processing unit; and each service processing unit includes at least one context cluster, and each context cluster includes at least one user context.

The data dispatch unit receives a data processing message, where the data processing message includes a user identifier and to-be-processed service data; and obtains, according to the user identifier, a third context cluster corresponding to the user identifier.

The data dispatch unit acquires a fourth service processing unit, in the at least one service processing unit, corresponding to the third context cluster, and sends the service data to the fourth service processing unit.

An embodiment of the present invention further provides a network device. The device may likewise include: at least one service processing unit, a data dispatch unit and a control unit; the at least one service processing unit includes a first service processing unit and a second service processing unit; and each service processing unit includes at least one context cluster, and each context cluster includes at least one user context.

The data dispatch unit receives a user activation message, where the user activation message includes context data and a user identifier; and establishes a correspondence between the user identifier and a fourth context cluster.

The data dispatch unit acquires a fifth service processing unit corresponding to the fourth context cluster, and sends the context data, and a fourth cluster identifier of the fourth context cluster to the fifth service processing unit.

The fifth service processing unit generates a user context according to the context data, and stores the user context in the fourth context cluster according to the fourth cluster identifier.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method of terminal management, wherein the method is executed by at least one service processing unit, a data dispatch unit and a control unit; the at least one service processing unit comprises a first service processing unit and a second service processing unit; each service processing unit comprises at least one context cluster, and each context cluster comprises at least one user context; and the method comprises:
  sending, by the control unit, to the first service processing unit and the data dispatch unit separately, a context migration indication message comprising: a first cluster identifier corresponding to a first context cluster that is to be migrated, a unit identifier of the second service processing unit to which the first context cluster is to be migrated, and a cluster migration indication, the first context cluster comprising a plurality of user contexts, and at least one of the first or second service processing units comprising a plurality of context clusters;

sending, by the first service processing unit, the first context cluster corresponding to the first cluster identifier to the second service processing unit according to the cluster migration indication; and changing, by the data dispatch unit according to the cluster migration indication, a correspondence between the first context cluster and the first service processing unit and stored in the data dispatch unit, and changing the first service processing unit in the correspondence into the second service processing unit.

2. The method according to claim 1, wherein after the sending, by the control unit, to the first service processing unit, a context migration indication message, the method further comprises:

storing, by the control unit, a correspondence between the first service processing unit and the first cluster identifier, so as to indicate, according to the correspondence, that the first context cluster corresponding to the first cluster identifier is migrated again back to the first service processing unit.

3. The method according to claim 1, wherein the method further comprises:

receiving, by the data dispatch unit, a data processing message, the data processing message comprising a user identifier and to-be-processed service data; and obtaining, according to the user identifier, a third context cluster corresponding to the user identifier; and acquiring, by the data dispatch unit, a fourth service processing unit, in the at least one service processing unit, corresponding to the third context cluster, and sending the service data to the fourth service processing unit.

4. The method according to claim 1, wherein the method further comprises:

receiving, by the data dispatch unit, a user activation message, the user activation message comprising context data and a user identifier, and establishing a correspondence between the user identifier and a fourth context cluster;

acquiring, by the data dispatch unit, a fifth service processing unit corresponding to the fourth context cluster, and sending the context data, and a fourth cluster identifier of the fourth context cluster to the fifth service processing unit; and generating, by the fifth service processing unit, a user context according to the context data, and storing the user context in the fourth context cluster according to the fourth cluster identifier.

5. A terminal management method, wherein the method is executed by at least one service processing unit, a data dispatch unit and a control unit; the at least one service processing unit comprises a first service processing unit and a second service processing unit; each service processing unit comprises at least one context cluster, and each context cluster comprises at least one user context; and the method comprises:

sending, by the control unit, a context cluster allocation message to a newly added third service processing unit, the context cluster allocation message comprising: a second cluster identifier corresponding to a newly allocated second context cluster comprising a plurality of user contexts, and a cluster allocation indication; and establishing, by the third service processing unit, the second context cluster in the third service processing unit according to the cluster allocation indication, the third service processing unit comprising a plurality of context clusters;

sending, by the control unit, a context cluster adding message to the data dispatch unit, the context cluster adding message comprising: the second cluster identifier corresponding to the newly allocated second context cluster, a cluster adding indication, and a unit identifier of the third service processing unit; and recording, by the data dispatch unit, a correspondence between the second cluster identifier and the third service processing unit according to the cluster adding indication, so as to forward service data corresponding to the second context cluster to the third service processing unit according to the correspondence.

6. A method of terminal management, wherein the method is executed by at least one service processing unit, a data dispatch unit and a control unit; the at least one service processing unit comprises a first service processing unit and a second service processing unit; each service processing unit comprises at least one context cluster, and each context cluster comprises at least one user context; and the method comprises:

newly adding, by the control unit, a third service processing unit, in the at least one service processing unit;

sending, by the control unit to the third service processing unit, a context cluster allocation message comprising a cluster allocation indication, a third cluster identifier corresponding to a third context cluster, and a fourth cluster identifier corresponding to a fourth context cluster;

establishing, by the third service processing unit, the third context cluster and the fourth context cluster according to the cluster allocation indication;

receiving, by the data dispatch unit from the control unit, a cluster adding message comprising a cluster adding indication, the third cluster identifier, the fourth cluster identifier, and a unit identifier corresponding to the third service processing unit;

recording, by the data dispatch unit, a correspondence between third service processing unit and the third and fourth context clusters according to the cluster adding indication;

receiving, by the data dispatch unit, a data processing message comprising a user identifier and to-be-processed service data;

obtaining, by the data dispatch unit according to the user identifier, the third context cluster as corresponding to the user identifier, the third context cluster comprising a plurality of user contexts; and sending, by the data dispatch unit, the service data and the third cluster identifier to the third service processing unit.

7. A terminal management method, wherein the method is executed by at least one service processing unit, a data dispatch unit and a control unit; the at least one service processing unit comprises a first service processing unit and a second service processing unit; each service processing unit comprises at least one context cluster, and each context cluster comprises at least one user context; and the method comprises:

receiving, by the data dispatch unit from a to-be-activated user equipment (UE), a user activation message, the user activation message comprising context data and a user identifier of the UE;
establishing a correspondence between the user identifier and a third context cluster in accordance with service processing unit loading, the third context cluster comprising a plurality of user contexts;
storing, by the data dispatch unit, the correspondence between the user identifier and the third context cluster in a user distribution table;
acquiring, by the data dispatch unit from a cluster location table, a third service processing unit corresponding to the third context cluster;
sending the context data, the user identifier, and a third cluster identifier of the third context cluster to the third service processing unit, the third service processing unit comprising a plurality of context clusters;
generating, by the third service processing unit, a first user context according to the context data;
storing the first user context in the third context cluster according to the third cluster identifier;
receiving, by the data dispatch unit, a data processing message comprising the user identifier and to-be-processed service data;
obtaining, by the data dispatch unit according to the user identifier, the third context cluster as corresponding to the user identifier; and
sending, by the data dispatch unit, the service data and the third cluster identifier to the third service processing unit.

8. A network device, comprising:
a data dispatch unit;
at least one service processing unit comprising
a first service processing unit and a second service processing unit; each service processing unit comprises at least one context cluster, wherein at least one of the first or second service processing units comprises a plurality of context clusters, and each context cluster comprises at least one user context; and
a control unit configured to send a context migration indication message to the first service processing unit and the data dispatch unit separately, wherein the context migration indication message comprises: a first cluster identifier corresponding to a first context cluster that is to be migrated, a unit identifier of the second service processing unit to which the first context cluster is to be migrated, and a cluster migration indication, wherein the first context cluster comprises a plurality of user contexts;
the first service processing unit is configured to send the first context cluster corresponding to the first cluster identifier to the second service processing unit according to the cluster migration indication; and
the data dispatch unit is configured to change, according to the cluster migration indication, a correspondence between the first context cluster and the first service processing unit and stored in the data dispatch unit, and change the first service processing unit in the correspondence into the second service processing unit.

9. The network device according to claim 8, wherein the control unit is further configured to: after sending the context migration indication message to the first service processing unit, store a correspondence between the first service processing unit and the first cluster identifier, so as to indicate again, according to the correspondence, that the first context cluster corresponding to the first cluster identifier is migrated back to the first service processing unit.

10. The network device according to claim 8, wherein the data dispatch unit is further configured to: receive a data processing message, wherein the data processing message comprises a user identifier and to-be-processed service data; obtain, according to the user identifier, a third context cluster corresponding to the user identifier; and acquire a fourth service processing unit, in the at least one service processing unit, corresponding to the third context cluster, and send the service data to the fourth service processing unit.

11. The network device according to claim 8, wherein the data dispatch unit is further configured to: receive a user activation message, wherein the user activation message comprises context data and a user identifier, and establish a correspondence between the user identifier and a fourth context cluster; and acquire a fifth service processing unit corresponding to the fourth context cluster, and send the context data, and a fourth cluster identifier of the fourth context cluster to the fifth service processing unit; and
the fifth service processing unit is configured to generate a user context according to the context data, and store the user context in the fourth context cluster according to the fourth cluster identifier.

12. A network device, comprising: at least one service processing unit, a data dispatch unit and a control unit, wherein the at least one service processing unit comprises a first service processing unit and a second service processing unit; each service processing unit comprises at least one context cluster, and each context cluster comprises at least one user context;
the control unit is configured to: send a context cluster allocation message to a newly added third service processing unit, wherein the context cluster allocation message comprises: a second cluster identifier corresponding to a newly allocated second context cluster comprising a plurality of user contexts, and a cluster allocation indication; and send a context cluster adding message to the data dispatch unit, wherein the context cluster adding message comprises: the second cluster identifier corresponding to the newly allocated second context cluster, a cluster adding indication, and a unit identifier of the third service processing unit, wherein the third service processing unit comprises a plurality of context clusters;
the third service processing unit is configured to establish the second context cluster in the third service processing unit according to the cluster allocation indication; and
the data dispatch unit is further configured to record a correspondence between the second cluster identifier and the third service processing unit according to the cluster adding indication, so as to forward service data corresponding to the second context cluster to the third service processing unit according to the correspondence.

13. A network device, comprising:
a data dispatch unit,
a control unit, and
at least one service processing unit comprising:
a first service processing unit and a second service processing unit; each service processing unit comprises at least one context cluster, and each context cluster comprises at least one user context;

the control unit newly adds a third service processing unit, in the at least one service processing unit;

the control unit sends, to the third service processing unit, a context cluster allocation message comprising a cluster allocation indication, a third cluster identifier corresponding to a third context cluster, and a fourth cluster identifier corresponding to a fourth context cluster;

the third service processing unit establishes the third context cluster and the fourth context cluster according to the cluster allocation indication;

the data dispatch unit receives, from the control unit, a cluster adding message comprising a cluster adding indication, the third cluster identifier, the fourth cluster identifier, and a unit identifier corresponding to the third service processing unit;

the data dispatch unit records a correspondence between third service processing unit and the third and fourth context clusters according to the cluster adding indication;

the data dispatch unit receives a data processing message, wherein the data processing message comprises a user identifier and to-be-processed service data;

the data dispatch unit obtains, according to the user identifier, the third context cluster as corresponding to the user identifier, wherein the third context cluster comprises a plurality of user contexts; and the data dispatch unit sends the service data and the third cluster identifier to the third service processing unit.

14. A network device, comprising: at least one service processing unit, a data dispatch unit and a control unit, wherein the at least one service processing unit comprises a first service processing unit and a second service processing unit; each service processing unit comprises at least one context cluster, and each context cluster comprises at least one user context;

the data dispatch unit receives a user activation message from a to-be-activated user equipment (UE), wherein the user activation message comprises context data and a user identifier of the UE;

the data dispatch unit establishes a correspondence between the user identifier and a third context cluster in accordance with service processing unit loading, the third context cluster comprising a plurality of user contexts;

the data dispatch unit stores the correspondence between the user identifier and the third context cluster in a user distribution table;

the data dispatch unit acquires a third service processing unit from a cluster location table, the third service processing unit corresponding to the third context cluster;

the data dispatch unit sends the context data, the user identifier, and a third cluster identifier of the third context cluster to the third service processing unit, wherein the third service processing unit comprises a plurality of context clusters;

the third service processing unit generates a first user context according to the context data;

the third service processing unit stores the first user context in the third context cluster according to the third cluster identifier;

the data dispatch unit receives a data processing message comprising the user identifier and to-be-processed service data;

the data dispatch unit obtains, according to the user identifier, the third context cluster as corresponding to the user identifier; and the data dispatch unit sends the service data and the third cluster identifier to the third service processing unit.

* * * * *